US010985860B2

(12) United States Patent
Yang et al.

(10) Patent No.: US 10,985,860 B2
(45) Date of Patent: Apr. 20, 2021

(54) METHOD FOR MANAGING MULTI-WAVELENGTH PASSIVE OPTICAL NETWORK, AND OPTICAL MODULE

(71) Applicant: ZTE CORPORATION, Guangdong (CN)

(72) Inventors: Bo Yang, Shenzhen (CN); Xingang Huang, Shenzhen (CN); Mingsheng Li, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 223 days.

(21) Appl. No.: 16/081,755

(22) PCT Filed: Jul. 19, 2016

(86) PCT No.: PCT/CN2016/090457
§ 371 (c)(1),
(2) Date: Aug. 31, 2018

(87) PCT Pub. No.: WO2017/148079
PCT Pub. Date: Sep. 8, 2017

(65) Prior Publication Data
US 2020/0235840 A1 Jul. 23, 2020

(30) Foreign Application Priority Data
Mar. 1, 2016 (CN) .......................... 201610118871.2

(51) Int. Cl.
H04J 14/02 (2006.01)
G06F 8/65 (2018.01)
(Continued)

(52) U.S. Cl.
CPC ............ *H04J 14/0227* (2013.01); *G06F 8/65* (2013.01); *G06F 8/71* (2013.01); *H04L 41/082* (2013.01); *H04Q 11/0067* (2013.01)

(58) Field of Classification Search
CPC .......................................... H04J 14/023–0236
See application file for complete search history.

(56) References Cited

U.S. PATENT DOCUMENTS

2007/0092256 A1 4/2007 Nozue et al.
2011/0091213 A1 4/2011 Kawaza et al.
(Continued)

FOREIGN PATENT DOCUMENTS

CN 101621399 A 1/2010
CN 101814958 A 8/2010
(Continued)

OTHER PUBLICATIONS

International Search Report and Written Opinion for International Appl. No. PCT/CN2016/090457, dated Nov. 30, 2016.
(Continued)

Primary Examiner — Nathan M Cors
(74) Attorney, Agent, or Firm — Foley & Lardner LLP

(57) ABSTRACT

A method for managing a multi-wavelength passive optical network, comprising: an optical module extracting a module management signal from a reception signal input from an optical signal interface, where the module management signal carries a management message related to the optical module. The solution can solve the problem that an optical module of a multi-wavelength passive optical network in the related art cannot support the smooth upgrade of a related device to the multi-wavelength passive optical network.

12 Claims, 7 Drawing Sheets

(51) Int. Cl.
  *G06F 8/71* (2018.01)
  *H04L 12/24* (2006.01)
  *H04Q 11/00* (2006.01)

(56) References Cited

U.S. PATENT DOCUMENTS

| | | | |
|---|---|---|---|
| 2012/0093515 A1 | 4/2012 | Lin | |
| 2012/0288279 A1* | 11/2012 | Zhang | H04Q 11/0067 398/66 |
| 2013/0094861 A1* | 4/2013 | Luo | H04J 14/0241 398/68 |
| 2013/0259482 A1* | 10/2013 | Sarashina | H04J 14/0267 398/67 |
| 2014/0248053 A1* | 9/2014 | Tamai | H04Q 11/0067 398/66 |
| 2015/0098704 A1* | 4/2015 | Gao | H04J 14/0246 398/68 |
| 2017/0207875 A1* | 7/2017 | Yoshida | H04B 10/032 |
| 2018/0212705 A1* | 7/2018 | Gao | H04L 29/06 |

FOREIGN PATENT DOCUMENTS

| | | |
|---|---|---|
| CN | 101997614 A | 3/2011 |
| CN | 102412892 A | 4/2012 |
| CN | 104753590 A | 7/2015 |
| JP | 2006-197489 A | 7/2006 |

OTHER PUBLICATIONS

Extended European Search Report for EP Appl. No. 16892267.2, dated Oct. 11, 2019.
First Office Action for CN Appl. No. 201610118871.2, dated Sep. 20, 2018.

* cited by examiner (a)

(b)

METHOD FOR MANAGING MULTI-WAVELENGTH PASSIVE OPTICAL NETWORK, AND OPTICAL MODULE

CROSS-REFERENCE TO RELATED APPLICATIONS

This is a National Stage Application, filed under 35 U.S.C. 371, of International Patent Application No. PCT/CN2016/090457, filed on Jul. 19, 2016, which claims priority to Chinese Patent Application No. 201610118871.2 filed on Mar. 1, 2016, contents of both of which are incorporated herein by reference in their entireties.

TECHNICAL FIELD

The present application relates to, but is not limited to, the field of an optical access technology and, in particular, to a method for managing a multi-wavelength passive optical network and an optical module.

BACKGROUND

In recent years, with access network users' increasing demand for bandwidth, an optical access technology for a passive optical network (PON) is gradually altered from a traditional time division multiplexing (TDM) technology to a wavelength division multiplexing (WDM) technology. A multi-wavelength PON, such as a wavelength-division multiplexing PON (WDM-PON) and a time- and wavelength-division multiplexing PON (TWDM-PON), can meet a higher bandwidth demand by increasing the number of uplink and downlink wavelength pairs and using WDM or TWDM technologies. The WDM-PON has the advantages of abundant bandwidth, short time delays and good security and has unique advantages in application scenarios such as radio bearers or private network users.

In the multi-wavelength PON, an in-band channel is usually used to transfer a management message such as wavelength switching, wavelength allocation and ONU status monitoring between an optical line terminal (OLT) and an optical network unit (ONU). For example, in the existing art, the multi-wavelength PON manages wavelengths through physical layer operations, administration, and management (PLOAM) messages and ONU management and control interface (OMCI) channels. Alternatively, the WDM-PON system allocates wavelengths by expanding operation, administration and maintenance (OAM). In-band management reuses a physical channel of a data signal without need to modify physical layer hardware, so that the device configuration is relatively simple, but there are problems such as large delay jitters, difficulty in multi-rate compatibility and occupation of data channel bandwidth. Therefore, out-of-band management becomes another choice for management and control channels of the multi-wavelength PON. The International Telecommunication Union Telecommunication Standardization Sector (ITU-T) defines an auxiliary management and control channel (AMCC) in the Next Generation PON2 (NG-PON2) standard G.989.3. An out-of-band AMCC helps to achieve the wavelength calibration and registration of a non-calibrated tunable ONU for the TWDM-PON. Meanwhile, G.989.3 also defines an out-of-band AMCC of the point-to-point (PTP) WDM to manage a PTP network. There are several technical means of implementing the out-of-band AMCC. For example, the wavelength of the WDM-PON network is managed by using the second uplink and downlink wavelength pair different from the wavelength of the data signal, or the wavelength of the WDM-PON system is managed by the pilot tone modulation of signal light.

However, in the related solution for out-of-band management of the multi-wavelength PON, an optical module only transfers a management signal on a physical layer, and the parsing processing of the management signal needs to be performed through a corresponding management signal processing module (such as a medium access control (MAC) chip) in a device. However, the network devices currently used in networks such as mobile bearers and switches do not include this module. Therefore, it is difficult to achieve smooth upgrade of a related device to the multi-wavelength PON via reconstruction.

SUMMARY

The following is a summary of the subject matter described in detail in the present application. This summary is not intended to limit the scope of the claims.

Embodiments of the present disclosure provide a method for managing a multi-wavelength passive optical network and an optical module in order to solve the problem in the existing art that an optical module for a multi-wavelength passive optical network does not support the smooth upgrade of a related device to the multi-wavelength passive optical network.

The embodiments of the present disclosure provide a method for managing a multi-wavelength passive optical network, which is applicable to an optical module for the multi-wavelength passive optical network. The method includes: operating the optical module to extract a module management signal from a received signal inputted through an optical signal interface. The module management signal carries a management message related to the optical module.

The embodiments of the present disclosure provide a method for managing a multi-wavelength passive optical network, which is applicable to an optical module for the multi-wavelength passive optical network. The method includes: operating the optical module to extract a module management signal and a device management signal from a received signal inputted through an optical signal interface. The module management signal carries a management message related to the optical module and the device management signal carries a management message related to a multi-wavelength passive optical network device.

In an implementation, the method further includes: operating the optical module to load, a device management feedback signal transmitted from the multi-wavelength passive optical network device, a data signal transmitted from the multi-wavelength passive optical network device and a module management feedback signal sent from the optical module, into a transmission signal and send the transmission signal.

In an implementation, operating the optical module to extract the module management signal and the device management signal from the received signal inputted through the optical signal interface includes: operating the optical module to distinguish between the module management signal and the device management signal.

In an implementation, the operating the optical module to distinguish between the module management signal and the device management signal includes operating the optical module to distinguish between the module management signal and the device management signal according to a management message frame, where the management message frame includes at least one of the following: a management message-type check byte, a destination address and a device identifier (ID).

In an implementation, the operating the optical module to distinguish between the module management signal and the device management signal includes the two manners described below.

The optical module may distinguish between the module management signal and the device management signal according to frequencies of the signals, where the frequency of the module management signal is different from the frequency of the device management signal.

In an implementation, the optical module may distinguish between the module management signal and the device management signal according to wavelengths of the signals, where the wavelength of the module management signal is different from the wavelength of the device management signal.

The embodiments of the present disclosure further provide an optical module for a multi-wavelength passive optical network, including: a receiving and transmitting optical component, a signal processing unit and a module control unit.

The signal processing unit is configured to extract a module management signal from a received signal received by the receiving and transmitting optical component through an optical signal interface, and transmit the module management signal to the module control unit, where the module management signal carries a management message related to the optical module.

The module control unit is configured to manage the optical module according to the module management signal.

The embodiments of the present disclosure further provide an optical module for a multi-wavelength passive optical network. The optical module is connected to a multi-wavelength passive optical network device through a device management signal interface. The optical module includes: a receiving and transmitting optical component, a signal processing unit and a module control unit.

The signal processing unit is configured to extract a module management signal and a device management signal from a received signal received by the receiving and transmitting optical component through an optical signal interface, transmit the module management signal to the module control unit, and transmit the device management signal to the multi-wavelength passive optical network device through the device management signal interface. The module management signal carries a management message related to the optical module and the device management signal carries a management message related to the multi-wavelength passive optical network device.

The module control unit is configured to manage the optical module according to the module management signal.

In an implementation, the received signal includes one signal or a plurality of signals. When the received signal includes the one signal, the one signal includes a combination of a data signal, the module management signal and the device management signal. When the received signal includes the plurality of signals, the plurality of signals include the data signal, the module management signal and the device management signal, or the plurality of signals include the data signal and a management signal.

In an implementation, the signal processing unit includes a first processing unit and a second processing unit.

The first processing unit is configured to extract a management signal from the received signal and transmit the extracted management signal to the second processing unit.

The second processing unit is configured to extract the module management signal and the device management signal from the management signal, transmit the module management signal to the module control unit, and transmit the device management signal to the multi-wavelength passive optical network device through the device management signal interface.

In an implementation, the second processing unit is further configured to, combine a device management feedback signal inputted through the device management signal interface with a module management feedback signal inputted by the module control unit, and send the combined management feedback signal to the first processing unit; or send the device management feedback signal inputted through the device management signal interface and the module management feedback signal inputted by the module control unit to the first processing unit.

In an implementation, the optical module is connected to the multi-wavelength passive optical network device through a data signal interface. The first processing unit is further configured to: send a data signal inputted through the data signal interface and a management feedback signal inputted by the second processing unit to the receiving and transmitting optical component through the respective interfaces. In an implementation, the first processing unit is further configured to combine the data signal inputted through the data signal interface with the management feedback signal inputted by the second processing unit and send the combined signal to the receiving and transmitting optical component.

In an implementation, the optical module is connected to the multi-wavelength passive optical network device through a data signal interface. The signal processing unit is further configured to: send, a module management feedback signal inputted by the module control unit, a device management feedback signal inputted through the device management signal interface and a data signal inputted through the data signal interface, to the receiving and transmitting optical component through the respective interfaces.

In an implementation, the module control unit is configured to obtain a management instruction according to the module management signal, send the management instruction to the receiving and transmitting optical component, and send feedback information from the receiving and transmitting optical component to the signal processing unit.

In an implementation, the signal processing unit is configured to distinguish between the module management signal and the device management signal according to a management message frame, where the management message frame includes at least one of the following: a management message-type check byte, a destination address and a device identifier (ID).

In an implementation, the signal processing unit is configured to distinguish between the module management signal and the device management signal according to frequencies of the signals, where the frequency of the module management signal is different from the frequency of the device management signal.

In an implementation, the receiving and transmitting optical component is configured to distinguish between the module management signal and the device management signal according to wavelengths of the signals, where the wavelength of the module management signal is different from the wavelength of the device management signal.

In the embodiments of the present disclosure, the optical module extracts the module management signal and the device management signal from the received signal inputted through the optical signal interface. With the embodiments of the present disclosure, the optical module does not need to control and adjust a physical layer parameter with the assistance of a device, but can manage and control the physical layer parameter by the optical module itself to satisfy applications of existing network devices such as mobile bearers and switches. Moreover, the management method and the optical module provided in the embodiments of the present disclosure can be widely applicable to the existing network devices and new devices, thereby achieving the smooth evolution of the multi-wavelength passive optical network.

Other aspects can be understood after the accompanying drawings and the detailed description are read and understood.

DETAILED DESCRIPTION

Figure 1:
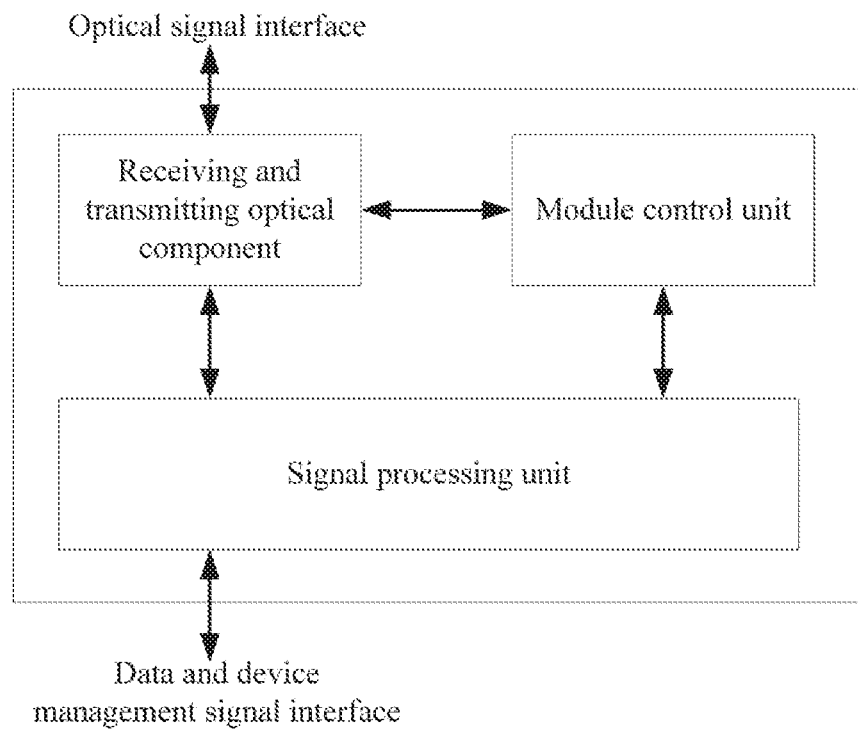
FIG. 1 is a structural view 1 of an optical module for a multi-wavelength passive optical network according to embodiments of the present disclosure.

Embodiments of the present disclosure will be described in detail in conjunction with the accompanying drawings, and it is understood that the embodiments described hereinafter are intended to describe and explain the present application and not to limit the present application.

The embodiments of the present disclosure provide a method for managing a multi-wavelength passive optical network, which is applicable to an optical module for the multi-wavelength passive optical network. The method includes the step described below.

The optical module extracts a module management signal from a received signal inputted through an optical signal interface. The module management signal carries a management message related to the optical module.

In an implementation, the optical module is connected to a multi-wavelength passive optical network device through a data and device management signal interface. Through the data and device management signal interface, a data signal and a device management signal may be transmitted between the optical module and the multi-wavelength passive optical network device. That is, the data and device management signal interface is shared by the device management signal and the data signal for transmission.

In an implementation, the method further includes following steps in which, the optical module loads, a data and device management feedback signal transmitted from the multi-wavelength passive optical network device and a module management feedback signal sent from the optical module, into a transmission signal, and sends the transmission signal. The data and device management feedback signal is received through the data and device management signal interface.

The embodiments of the present disclosure further provide a method for managing a multi-wavelength passive optical network, which is applicable to an optical module for the multi-wavelength passive optical network. The method includes steps described below.

The optical module extracts a module management signal and a device management signal from a received signal inputted through an optical signal interface. The module management signal carries a management message related to the optical module and the device management signal carries a management message related to a multi-wavelength passive optical network device.

After the optical module extracts and obtains the module management signal and the device management signal, the optical module transmits the device management signal to the multi-wavelength passive optical network device through a device management signal interface, and the optical module performs its own module management according to the management message carried by the module management signal.

In an implementation, the step in which the optical module extracts the module management signal and the device management signal from the received signal inputted through the optical signal interface includes steps described below.

The optical module extracts a management signal from the received signal inputted through the optical signal interface, and then extracts the module management signal and the device management signal from the management signal. The management signal carries a management message.

In an implementation, the optical module directly extracts the module management signal and the device management signal from the received signal inputted through the optical signal interface.

In an implementation, the method further includes following steps in which the optical module loads, a device management feedback signal transmitted from the multi-wavelength passive optical network device, a data signal transmitted from the multi-wavelength passive optical network device and a module management feedback signal sent from the optical module, into a transmission signal, and sends the transmission signal.

The module management feedback signal carries a feedback message from the optical module with respect to the management message related to the optical module. The device management feedback signal carries a feedback message from the multi-wavelength passive optical network device with respect to the management message related to the multi-wavelength passive optical network device.

In other words, the optical module may not only extract the module management signal and the device management signal from the received signal inputted through the optical signal interface, but also transmit the module management feedback signal from the optical module itself and the device management feedback signal and the data signal inputted by the multi-wavelength passive optical network device.

In an implementation, the step in which the optical module extracts the module management signal and the device management signal from the received signal inputted through the optical signal interface includes a step in which the optical module may distinguish between the module management signal and the device management signal.

In an implementation, the optical module may distinguish between the module management signal and the device management signal according to a management message frame. The management message frame includes at least one of the following: a management message-type check byte, a destination address and a device identifier (ID).

In an implementation, the optical module may distinguish between the module management signal and the device management signal according to frequencies of the signals, where the frequency of the module management signal is different from the frequency of the device management signal.

In an implementation, the optical module may distinguish between the module management signal and the device management signal according to wavelengths the signals, where the wavelength of the module management signal is different from the wavelength of the device management signal.

The management messages carried by the module management signal and the device management signal may include the management message frame. In an implementation, the module management signal and the device management signal are transmitted at different signal frequencies. In an implementation, the module management signal and the device management signal are transmitted at different signal wavelengths. In this way, the optical module may distinguish between the module management signal and the device management signal according to the management message frame, the frequencies of the signals or the wavelengths of the signals, in order to achieve transmission of the module management signal and the device management signal.

With the management method provided by the embodiments of the present disclosure, the optical module does not need to control and adjust a physical layer parameter with the assistance of a device, and but manage and control the physical layer parameter by the optical module itself to satisfy applications of existing network devices such as mobile bearers and switches. Moreover, the method further provides a management and control interface between the optical module and the multi-wavelength passive optical network device, and is also applicable to an application scenario in managing the device as needed.

FIG. 1 is a structural view 1 of an optical module for a multi-wavelength passive optical network according to the embodiments of the present disclosure. As shown in FIG. 1, the optical module for the multi-wavelength passive optical network according to this embodiment includes: a receiving and transmitting optical component, a signal processing unit and a module control unit.

The signal processing unit is configured to extract a module management signal from a received signal received by the receiving and transmitting optical component through an optical signal interface and transmit the module management signal to the module control unit. The module management signal carries a management message related to the optical module.

The module control unit is configured to manage the optical module according to the module management signal.

As shown in FIG. 1, the optical module is connected to a multi-wavelength passive optical network device through a data and device management signal interface. Through the data and device management signal interface, a data signal and a device management signal may be transmitted between the optical module and the multi-wavelength passive optical network device. That is, the data and device management signal interface is shared by the device management signal and the data signal for transmission.

In an implementation, the received signal includes one or two signals. When the received signal includes the one signal, the one signal includes a combination of a data and device management signal and the module management signal. When the received signal includes the two signals, the two signals include the module management signal and the data and device management signal.

Figure 2:
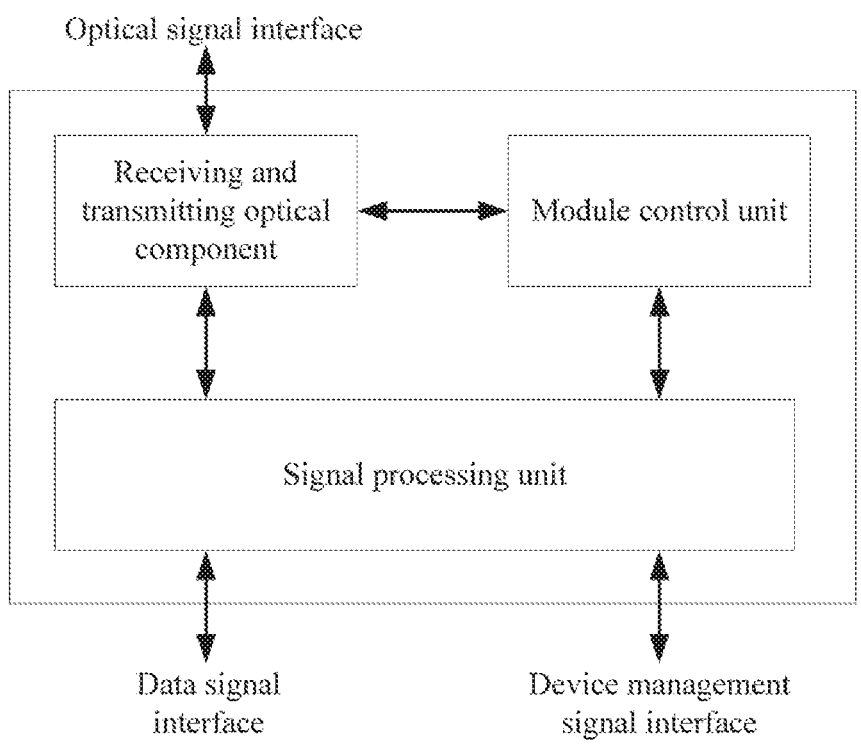
FIG. 2 is a structural view 2 of an optical module for a multi-wavelength passive optical network according to the embodiments of the present disclosure.

FIG. 2 is a structural view 2 of an optical module for a multi-wavelength passive optical network according to the embodiments of the present disclosure. As shown in FIG. 2, the optical module for the multi-wavelength passive optical network according to the embodiments includes a receiving and transmitting optical component, a signal processing unit and a module control unit. The optical module is connected to an optical distribution network (ODN) through an optical signal interface, and is connected to a multi-wavelength passive optical network device through a data signal interface and a device management signal interface.

The signal processing unit is configured to extract a module management signal and a device management signal from the received signal received by the receiving and transmitting optical component through the optical signal interface, transmit the module management signal to the module control unit, and transmit the device management signal to the multi-wavelength passive optical network device through the device management signal interface.

The module control unit is configured to manage the optical module according to the module management signal.

The module management signal carries a management message related to the optical module. The device management signal carries a management message related to the multi-wavelength passive optical network device.

The module control unit manages the optical module according to the management message carried by the module management signal. The multi-wavelength passive optical network device manages the multi-wavelength passive optical network device itself according to the management message carried by the device management signal.

In an implementation, the received signal includes one or a plurality of signals. When the received signal includes the one signal, the one signal includes a combination of a data signal, the module management signal and the device management signal. When the received signal includes the plurality of signals, the plurality of signals include the data signal, the module management signal and the device management signal, or the plurality of signals include the data signal and a management signal.

In an implementation, the signal processing unit includes a first processing unit and a second processing unit.

The first processing unit is configured to extract the management signal from the received signal and transmit the extracted management signal to the second processing unit.

The second processing unit is configured to extract the module management signal and the device management signal from the management signal, transmit the extracted module management signal to the module control unit, and transmit the extracted device management signal to the multi-wavelength passive optical network device through the device management signal interface.

In an implementation, the second processing unit is further configured to incorporate a device management feedback signal inputted through the device management signal interface with a module management feedback signal inputted by the module control unit and send the incorporated management feedback signal to the first processing unit, or the second processing unit is further configured to send the device management feedback signal inputted through the device management signal interface and the module management feedback signal inputted by the module control unit to the first processing unit.

In an implementation, the first processing unit is further configured to send the data signal inputted through the data signal interface and the management feedback signal inputted by the second processing unit to the receiving and transmitting optical component through the respective interfaces; or the first processing unit is further configured to incorporate the data signal inputted through the data signal interface with the management feedback signal inputted by the second processing unit and send the incorporated signal to the receiving and transmitting optical component.

In an implementation, the signal processing unit is further configured to send, the module management feedback signal inputted by the module control unit, the device management feedback signal inputted through the device management signal interface and the data signal inputted through the data signal interface, to the receiving and transmitting optical component through the respective interfaces.

In an implementation, the module control unit is configured to obtain a management instruction according to the module management signal, send the management instruction to the receiving and transmitting optical component, and send feedback information from the receiving and transmitting optical component to the signal processing unit.

In an implementation, the signal processing unit is configured to distinguish between the module management signal and the device management signal according to a management message frame. The management message frame includes at least one of the following: a management message-type check byte, a destination address and a device identifier (ID).

In an implementation, the signal processing unit is configured to distinguish between the module management signal and the device management signal according to frequencies of the signals, where the frequency of the module management signal is different from the frequency of the device management signal.

In an implementation, the receiving and transmitting optical component is configured to distinguish between the module management signal and the device management signal according to wavelengths of the signals, where the wavelength of the module management signal is different from the wavelength of the device management signal.

In an implementation, the signal processing unit includes a high-pass filter and a low-pass filter.

The high-pass filter is configured to extract the data signal and the management signal from the reception signal.

The low-pass filter is configured to extract the module management signal and the device management signal from the extracted management signal.

In an implementation, the signal processing unit includes a mixer. The mixer is configured to mix the device management feedback signal and the module management feedback signal having different frequencies, to obtain the management feedback signal.

The present application will be described hereinafter in conjunction with specific embodiments.

First Embodiment

Figure 3:
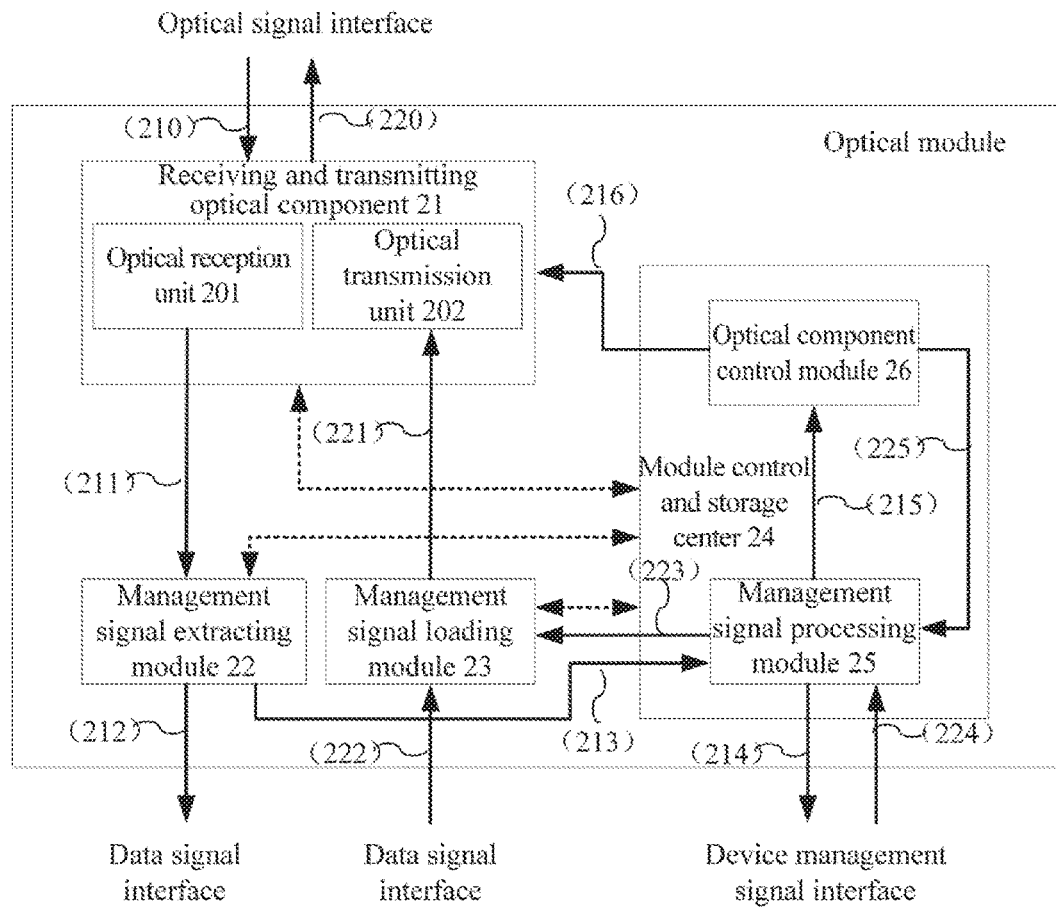
FIG. 3 is a structural view of an optical module for a multi-wavelength passive optical network according to a first embodiment of the present disclosure.

FIG. 3 is a structural view of an optical module for a multi-wavelength passive optical network according to a first embodiment of the present disclosure. As shown in FIG. 3, the optical module for the multi-wavelength passive optical network according to this embodiment includes a receiving and transmitting optical component 21, a management signal extracting module 22, a management signal loading module 23 and a module control and storage center 24.

Here, a signal processing unit includes a first processing unit and a second processing unit. The function of the first processing unit is implemented by the management signal extracting module 22 and the management signal loading module 23, the function of the second processing unit is implemented by a management signal processing module 25 of the module control and storage center 24, and the function of a module control unit is implemented by an optical component control module 26 and other control and storage modules of the module control and storage center 24.

The receiving and transmitting optical component 21 is connected to an optical distribution network through an optical signal interface. The receiving and transmitting optical component 21 includes an optical reception unit 201 and an optical transmission unit 202. The optical reception unit 201 and the optical transmission unit 202 may implement a single-fiber bi-directional interface with the optical distribution network (ODN) using a wavelength division multiplexing (WDM) device. The optical reception unit 201 may be composed of a photodetector, a transimpedance amplifier, a limiting amplifier and the like, in order to implement functions such as photoelectric conversion, electric signal amplification and limiting and shaping of the received optical signal (as indicated by an arrow 210). Moreover, the optical reception unit 201 transmits a data signal and a management signal to the management signal extracting module 22 through the respective interface (as indicated by an arrow 211). The optical transmission unit 202 may be composed of a laser, a modulator, a variable optical attenuator (VOA), a drive circuit and the like, in order to implement the electro-optic conversion of the data signal and a management feedback signal (as indicated by an arrow 220).

The management signal extracting module 22 and the management signal loading module 23 are connected to a multi-wavelength passive optical network device through a data signal interface.

The management signal extracting module 22 may separate the management signal from the data signal by way of amplitude detection, low-pass filtering and the like, send the data signal to the data signal interface (as indicated by an arrow 212), and send the management signal to the management signal processing module 25 inside the module control and storage center 24 (as indicated by an arrow 213).

The management signal loading module 23 receives the data signal inputted through the data signal interface (as indicated by an arrow 222) and the management feedback signal inputted by the management signal processing module 25 inside the module control and storage center 24 (as indicated by an arrow 223). The management signal loading module 23 combines the data signal and the management feedback signal by way of mixing and the like, and transmits the combined signal to the optical transmission unit 202 in the receiving and transmitting optical component 21 (as indicated by an arrow 221).

The module control and storage center 24 includes the management signal processing module 25, the optical component control module 26 and other control and storage modules. The module control and storage center 24 may have control functions on management signal processing, optical component control, and data buffering, as well as initialization, alarm detection, performance statistics and management message feedback statistics, etc. of various function units in the entire module. Within the module control and storage center 24, the management signal processing module 25 first extracts and parses the module management signal from the management signal, and then sends the module management signal to a control and storage center 27, so as to control each function unit of the optical module. For example, the module management signal is sent to the optical component control module 26 (as indicated by an arrow 215) to control the receiving and transmitting optical component 21 (as indicated by an arrow 216). In addition, the device management signal extracted from the management signal is sent to the multi-wavelength passive optical network device through the device management signal interface (as indicated by an arrow 214). The optical component control module 26 sends a feedback message to the management signal processing module 25 (as indicated by an arrow 225) after responding to the module management signal. The management signal processing module 25 combines a management feedback message inside the module with the device management feedback message inputted through the device management signal interface (as indicated by an arrow 224), and sends the combined signal to the management signal loading module 23 (as indicated by the arrow 223).

Figure 4:
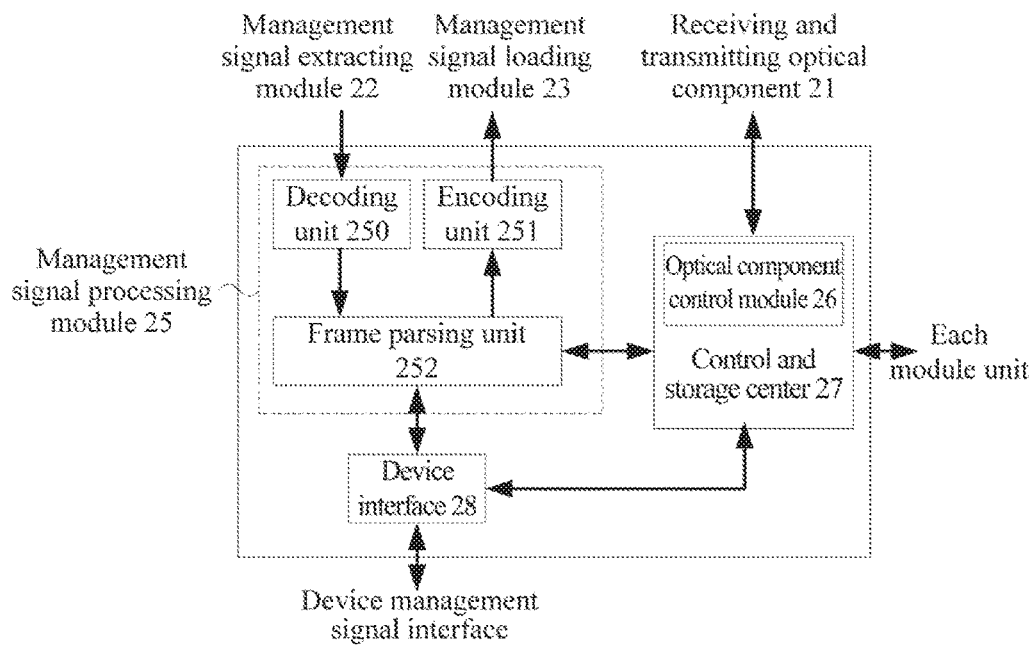
FIG. 4 is a structural view of a module control and storage center according to the first embodiment of the present disclosure.

FIG. 4 is a structural view of the module control and storage center 24 according to the first embodiment of the present disclosure. As shown in FIG. 4, the module control and storage center 24 includes the management signal processing module 25, the control and storage center 27 and a device interface 28. The management signal processing module 25 includes a decoding unit 250, an encoding unit 251 and a frame parsing unit 252. The control and storage center 27 includes the optical component control module 26.

The decoding unit 250 makes decoding processing on a bit stream inputted by the management signal extracting module 22 and restores the decoded data to the management message frame. The encoding unit 251 is used for encoding the management information in the management message frame into a code stream signal suitable for transmission, and transmitting the code stream signal to the management signal loading module 23.

The frame parsing unit 252 determines the type of the received management message frame according to the destination address or the check byte of the management message frame. If the received management message frame is the module management signal, the management message frame is sent to the control and storage center 27. If the received management message frame is the device management signal, the management message frame is sent to the device interface 28. The frame parsing unit 252 may further add the corresponding destination addresses or the corresponding check bytes to the device management feedback message inputted by the device interface 28 and the module management feedback message inputted by the control and storage center 27, respectively, to form the management message frame.

The device interface 28 may transfer the device management signal outputted from the frame parsing unit 252 to the multi-wavelength passive optical network device connected to the optical module, transfer the device management feedback message inputted by the device management signal interface to the frame parsing unit 252, and transfer other communication instructions between the multi-wavelength passive optical network device and the control and storage center 27.

The control and storage center 27 has module control and data storage functions, is connected to each function unit inside the optical module to control each module unit, and transmits, through the device interface 28, control feedback signals and alarm signals read from each module unit to the multi-wavelength passive optical network device connected to the optical module. Specifically, the control and storage center 27 includes the optical component control module 26, and is used for converting the module management signal inputted by the frame parsing unit 252 into the corresponding management instruction, transmitting the management instruction to the receiving and transmitting optical component 21, and combining and buffering the obtained feedback messages and transmitting the combined and buffered feedback messages to the frame parsing unit 252. The control and storage center 27 further provides the function of storing various types of management and control data.

The encoding unit 250, the decoding unit 251 and a frame parsing unit 252 may be implemented by field programmable gate array (FPGA) devices. The control and storage center 27 may be composed of a microcontroller unit (MCU), an electrically erasable programmable read-only memory (EEPROM) and the like. The control and storage center 27 may communicate with other units through interfaces such as Inter-Integrated Circuit (I²C), Management Data Input Output (MDIO) and Serial Peripheral Interface (SPI). The device interface 28 may be composed of one or more interfaces such as I²C, MDIO and SPI.

Figure 5:
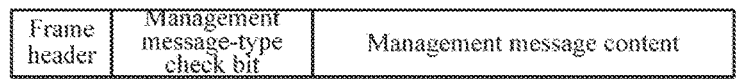
FIG. 5 is a schematic view of a management message frame according to the first embodiment of the present disclosure.
Figure 5:
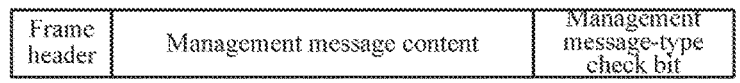

FIG. 5 is a schematic view of the management message frame according to the first embodiment of the present disclosure. As shown in FIG. 5, to distinguish between a module management message and a device management message, a corresponding check byte is added to and defined in the management message frame to distinguish between the types of the management messages. The check byte may be a frame header (as shown in FIG. 5(a)) or a frame trailer (as shown in FIG. 5(b)) of the management message frame. In addition, different destination addresses or device IDs may be defined in the management message frame to distinguish between the module management message and the device management message.

Second Embodiment

Figure 6:
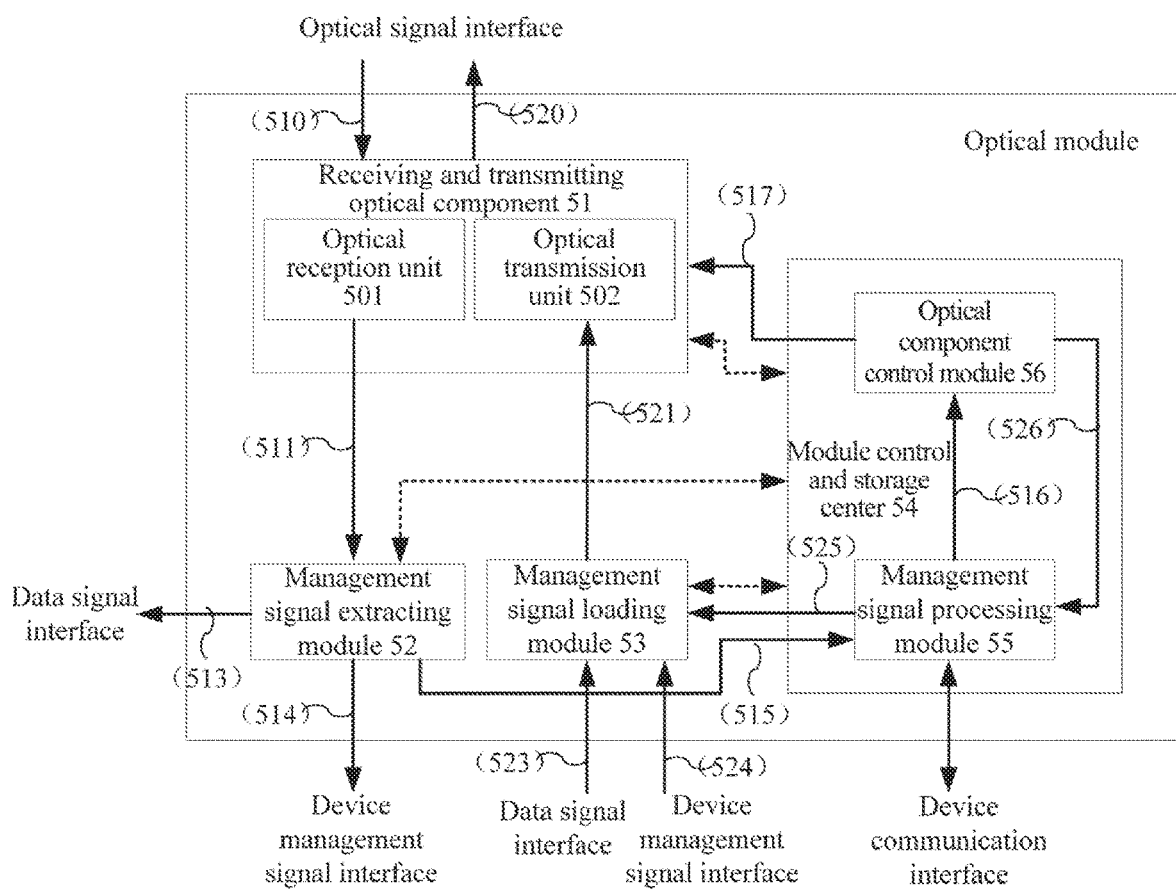
FIG. 6 is a structural view of an optical module for a multi-wavelength passive optical network according to a second embodiment of the present disclosure.

FIG. 6 is a structural view of an optical module for a multi-wavelength passive optical network according to a second embodiment of the present disclosure. As shown in FIG. 6, the optical module for the multi-wavelength passive optical network according to this embodiment includes a receiving and transmitting optical component 51, a management signal extracting module 52, a management signal loading module 53 and a module control and storage center 54.

Here, the function of a signal processing unit is implemented by the management signal extracting module 52 and the management signal loading module 53. The function of a module control unit is implemented by the module control and storage center 54.

The differences between this embodiment and the first embodiment lie in that, in this embodiment, the management signal extracting module 52 extracts the data signal, the device management signal and the module management signal, and the management signal loading module 53 loads the data signal, the device management feedback signal and the module management feedback signal. In the first embodiment, the management signal extracting module 22 extracts only the management signal, and the management signal loading module 23 loads only the data signal and the management feedback signal, but the extraction of the device management signal and the module management signal and loading on the device management feedback signal and the module management feedback signal are implemented by the management signal processing module 25 inside the module control and storage center 24.

The receiving and transmitting optical component 51 is connected to an optical distribution network through an optical signal interface. The receiving and transmitting optical component 51 includes an optical reception unit 501 and an optical transmission unit 502. The optical reception unit 501 and the optical transmission unit 502 may implement a single-fiber bi-directional interface with the ODN using a WDM device. The optical reception unit 501 may be composed of a photodetector, a transimpedance amplifier, a limiting amplifier and the like, in order to implement functions such as photoelectric conversion, electric signal amplification and limiting and shaping of the received optical signal (as indicated by an arrow 510). Moreover, the optical reception unit 501 transmits a data signal and a management signal to the management signal extracting module 52 through the corresponding interface (as indicated by an arrow 511). The optical transmission unit 502 may be composed of a laser, a modulator, a VOA, a drive circuit and the like, in order to implement the electro-optic conversion of the data signal and the management feedback signal (as indicated by an arrow 520).

The management signal extracting module 52 and the management signal loading module 53 are connected to a multi-wavelength passive optical network device through a device management signal interface and a data signal interface.

The management signal extracting module 52 may separate the module management signal, the device management signal and the data signal by way of amplitude detection, filtering and the like, send the module management signal to a management signal processing module 55 inside the module control and storage center 54 (as indicated by an arrow 515), send the data signal to the data signal interface (as indicated by an arrow 513), and send the device management signal to the device management signal interface (as indicated by an arrow 514). In an implementation, the management signal extracting module 52 receives the data signal, the device management signal and the module management signal inputted through different interfaces, sends the module management signal to the management signal processing module 55 inside the module control and storage center 54 (as indicated by the arrow 515), sends the data signal to the data signal interface (as indicated by the arrow 513), and sends the device management signal to the device management signal interface (as indicated by the arrow 514).

The management signal loading module 53 receives the data signal inputted through the data signal interface (as indicated by an arrow 523), the device management feedback signal inputted through the device management signal interface (as indicated by an arrow 524) and the module management feedback signal inputted by the management signal processing module 55 inside the module control and storage center 54 (as indicated by an arrow 525). Also, the management signal loading module 53 combines the data signal, the device management feedback signal and the module management feedback signal by way of mixing and the like and transmits the combined signal to the optical transmission unit 502 within the receiving and transmitting optical component 51 (as indicated by an arrow 521). In an implementation, the data signal, the module management feedback signal and the device management feedback signal are transmitted to the optical transmission unit 502 through different interfaces (as indicated by the arrow 521).

The module control and storage center 54 includes the management signal processing module 55, an optical component control module 56 and other control and storage modules. The module control and storage center 54 may have control functions on management signal processing, optical component control, and data buffering, as well as initialization, alarm detection, performance statistics and management message feedback statistics, etc. of various function units in the entire module. Within the module control and storage center 54, the management signal processing module 55 parses the inputted module management signal and then transmits the parsed signal, for example, to the optical component control module 56 to control the receiving and transmitting optical component 51 (as indicated by arrows 516 and 517). The optical component control module 56 sends a feedback message to the management signal processing module 55 (as indicated by an arrow 526) after responding to the module management signal. Further, the management signal processing module 55 sends a management feedback message inside the module to the management signal loading module 53 (as indicated by the arrow 525).

Figure 7:
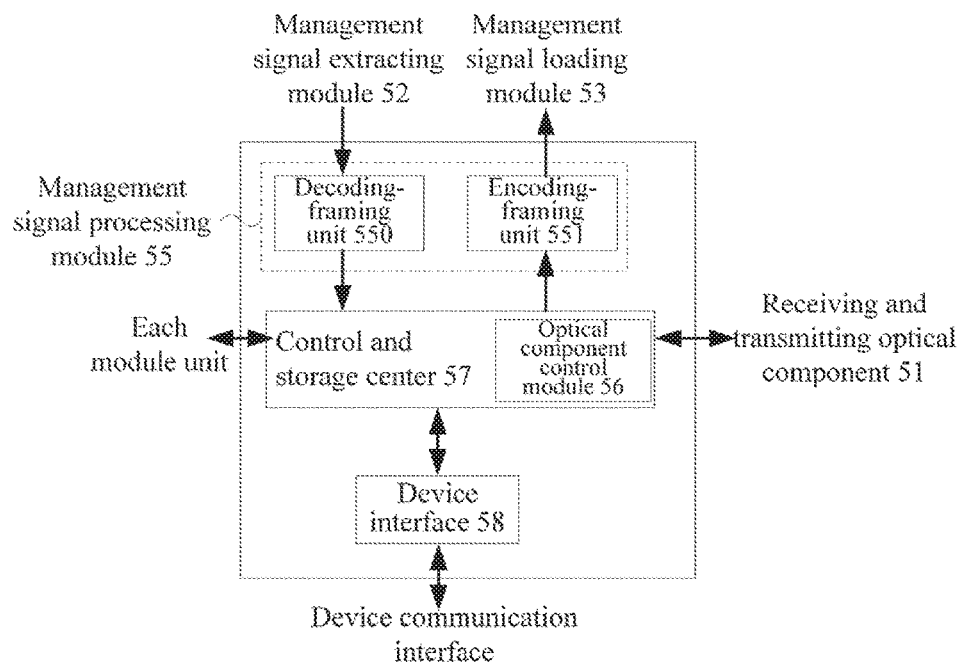
FIG. 7 is a structural view of a module control and storage center according to the second embodiment of the present disclosure.

FIG. 7 is a structural view of the module control and storage center 54 in the second embodiment of the present disclosure. As shown in FIG. 7, the module control and storage center 54 includes the management signal processing module 55, a control and storage center 57 and a device interface 58. The management signal processing module 55 includes a decoding-framing unit 550 and an encoding-framing unit 551. The control and storage center 57 includes the optical component control module 56.

The decoding-framing unit 550 performs decoding processing on a bit stream of the module management signal inputted by the management signal extracting module 52, restores the decoded data to the management message frame, and sends the management message frame to the control and storage center 57.

The encoding-framing unit 551 combines module management feedback messages inputted by the control and storage center 57 to form a module management message frame. The encoding-framing unit 551 is used for encoding the module management information in the module management message frame into a code stream signal suitable for transmission, and transmitting the code stream signal to the management signal loading module 53.

The device interface 58 transmits other communication instructions between the multi-wavelength passive optical network device and the control and storage center 57.

The control and storage center 57 has module control and data storage functions, is connected to each function unit inside the optical module to control each module unit, and transmits, through the device interface 58, control feedback signals and alarm signals read from each module unit to the multi-wavelength passive optical network device connected to the optical module. Specifically, the control and storage center 57 includes the optical component control module 56, and is used for converting the module management signal inputted by the decoding-framing unit 550 into the corresponding management instruction, transmitting the management instruction to the receiving and transmitting optical component 51, and buffering the obtained feedback messages and transmitting the buffered feedback messages to the encoding-framing unit 551. The control and storage center 57 further provides the function of storing various types of management and control data.

The encoding-framing unit 550 and the decoding-framing unit 551 may be implemented by FPGA devices and the control and storage center 57 may be composed of devices like a MCU, an FPGA and an EEPROM. The control and storage center 57 may communicate with other units through interfaces like I$^2$C, MDIO and SPI. The device interface 58 may be composed of one or more interfaces such as I$^2$C, MDIO and SPI.

In this embodiment, to distinguish between a module management message and a device management message, the management signal loading module may be used to load the module management feedback signal and the device management feedback signal with different frequencies onto the data signal, in the transmission direction of the management feedback message. The management signal extracting module may be used to separate the module management signal, the device management signal and the data signal from each other in the reception direction of the management message.

Figure 8:
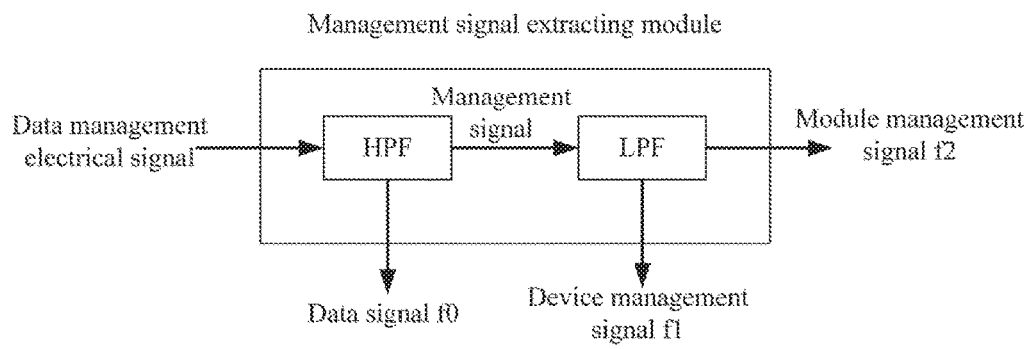
FIG. 8 is a schematic view of separating different types of management signals according to the second embodiment of the present disclosure.

FIG. 8 shows an example of the management signal extracting module. As shown in FIG. 8, the data management electrical signal carrying the management signal, which is converted by the optical reception unit of the receiving and transmitting optical component, is transmitted to the management signal extracting module, and then the high-frequency data information thereof is extracted by a high pass filter (HPF) to obtain a data signal f0, and the data signal f0 is transmitted to the data signal interface. The device management signal f1 with the first frequency in the management signal is extracted by a low pass filter (LPF) and transmitted to the device management signal interface. The remaining module management signal f2 with the second frequency is then transmitted to the management signal processing module inside the optical module.

Figure 9:
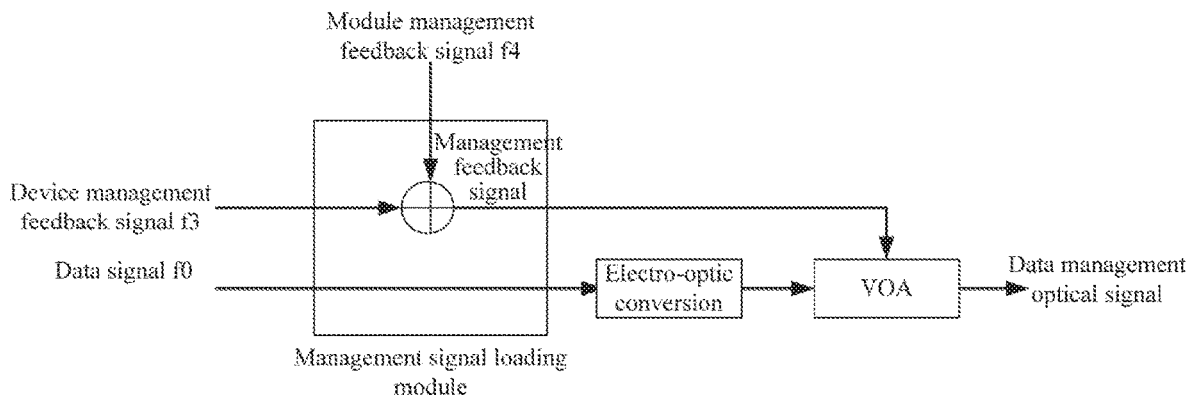
FIG. 9 is a schematic view of loading different types of management signals according to the second embodiment of the present disclosure.

FIG. 9 shows an example of the management signal loading module. As shown in FIG. 9, the data signal f0 is transmitted through the management signal loading module to the optical transmission unit of the receiving and transmitting optical component, and is converted to an optical signal through the electro-optic conversion. The device management feedback signal f3 with the first frequency and the module management feedback signal f4 with the second frequency are mixed by the mixer in the management signal loading module, and then transmitted to the optical transmission unit of the receiving and transmitting optical component, and then loaded onto the optical data signal through a variable optical attenuator (VOA).

Third Embodiment

Figure 10:
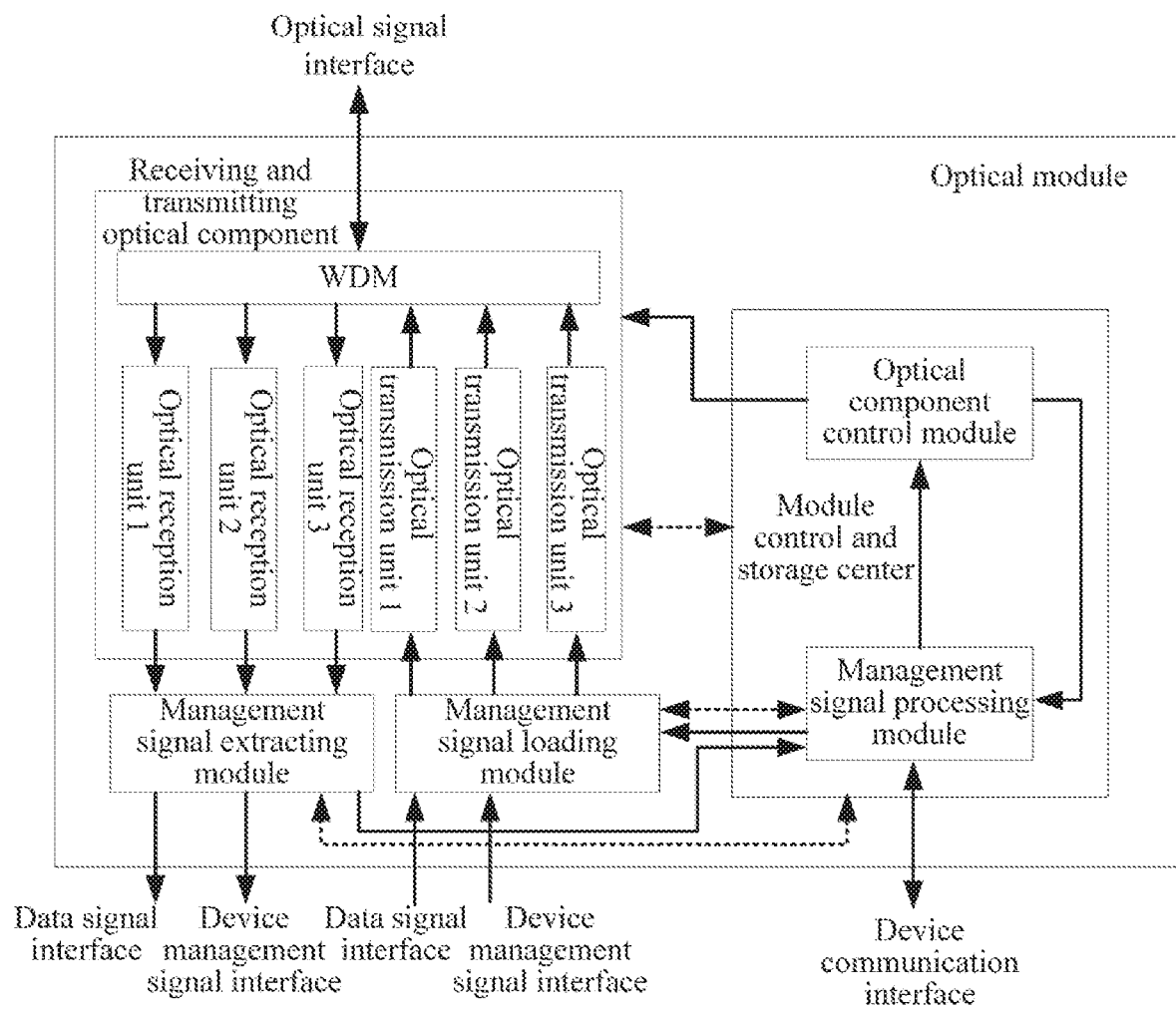
FIG. 10 is a structural view of an optical module for a multi-wavelength passive optical network according to a third embodiment of the present disclosure.

FIG. 10 is a structural view of an optical module for a multi-wavelength passive optical network according to a third embodiment of the present disclosure. As shown in FIG. 10, the optical module for the multi-wavelength passive optical network according to this embodiment includes a receiving and transmitting optical component, a management signal extracting module, a management signal loading module and a module control and storage center.

Here, the function of a signal processing unit is implemented by the management signal extracting module and the management signal loading module. The function of a module control unit is implemented by the module control and storage center.

The receiving and transmitting optical component is connected to an optical distribution network through an optical signal interface. The receiving and transmitting optical component includes multiple optical reception units, multiple optical transmission units and a WDM unit. The WDM unit may multiplex or demultiplex optical signals of different wavelengths to corresponding optical reception units and optical transmission units. Optical signals with different wavelengths are used to carry the data signal, the device management signal and the module management signal, respectively. The optical reception unit may be composed of a photodetector, a transimpedance amplifier, a limiting amplifier and the like, in order to implement functions such as photoelectric conversion, electric signal amplification and limiting and shaping of the optical reception signal. Moreover, the optical reception unit transmits the data signal, the device management signal and the module management signal to the management signal extracting module through the corresponding interfaces. The optical transmission unit may be composed of a laser, a modulator, a VOA, a drive circuit and the like, in order to implement the electro-optic conversion of the data signal, the device management feedback signal and the module management feedback signal.

The management signal extracting module transfers, the data signal, the device management signal and the module management signal inputted through different interfaces, to the data signal interface, the device management signal interface and a management signal processing module inside the module control and storage center, respectively.

The management signal loading module transfers, the data signal inputted through the data signal interface, the device management feedback signal inputted through the device management signal interface and the module management feedback signal inputted by the management signal processing module inside the module control and storage center, to the optical transmission unit through different interfaces.

The module control and storage center includes the management signal processing module, an optical component control module and other control and storage modules. The module control and storage center may have control functions on management signal processing, optical component control, and data buffering, as well as initialization, alarm detection, performance statistics and management message feedback statistics, etc. of various function units in the entire module. Within the module control and storage center, the management signal processing module parses the inputted module management signal and then transmits the parsed signal to the optical component control module to control the receiving and transmitting optical component. The optical component control module sends a feedback message to the management signal processing module after responding to a management and control message. Further, the management signal processing module sends a management feedback message inside the module to the management signal loading module.

Fourth Embodiment

Figure 11:
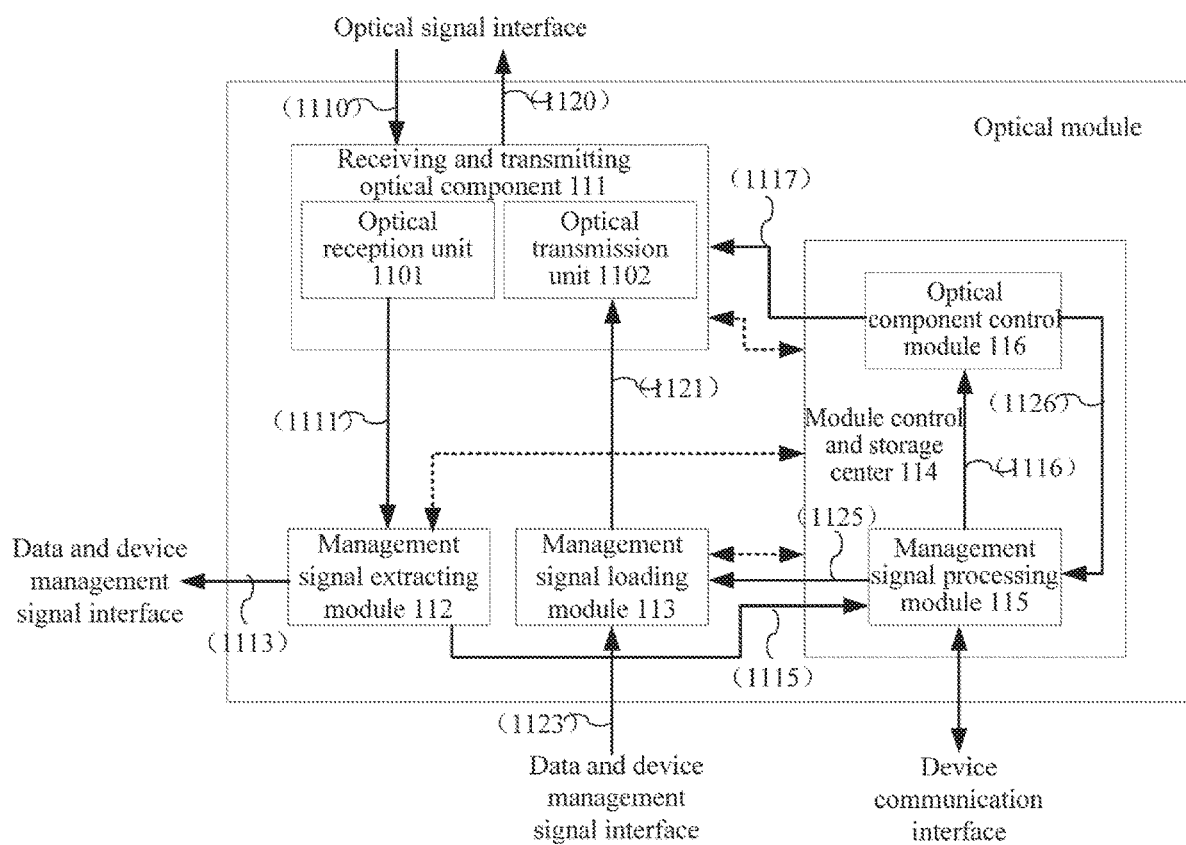
FIG. 11 is a structural view of an optical module for a multi-wavelength passive optical network according to a fourth embodiment of the present disclosure.

FIG. 11 is a structural view of an optical module for a multi-wavelength passive optical network according to a fourth embodiment of the present disclosure. As shown in FIG. 11, the optical module for the multi-wavelength passive optical network according to this embodiment includes a receiving and transmitting optical component 111, a management signal extracting module 112, a management signal loading module 113 and a module control and storage center 114.

Here, the function of a signal processing unit is implemented by the management signal extracting module 112 and the management signal loading module 113. The function of a module control unit is implemented by the module control and storage center 114.

The differences between this embodiment and the second embodiment lie in that, in this embodiment, the management signal extracting module 112 extracts the data and device management signal and the module management signal, and the management signal loading module 113 loads the data and device management feedback signal and the module management feedback signal. In the second embodiment, the management signal extracting module 52 extracts the data signal, the device management signal and the module management signal, and the management signal loading module 53 loads the data signal, the device management feedback signal and the module management feedback signal. In this embodiment, the data signal and the device management signal share the data and device management signal interface for transmission.

The receiving and transmitting optical component 111 is connected to the ODN through the optical signal interface. The receiving and transmitting optical component 111 includes an optical reception unit 1101 and an optical transmission unit 1102. The optical reception unit 1101 and the optical transmission unit 1102 may implement a single-fiber bi-directional interface with the ODN using a WDM device. The optical reception unit 1101 may be composed of a photodetector, a transimpedance amplifier, a limiting amplifier and the like, in order to implement functions such as photoelectric conversion, electric signal amplification and limiting and shaping of the received optical signal (as indicated by an arrow 1110). Moreover, the optical reception unit 1101 transmits a data and device management signal and a module management signal to the management signal extracting module 112 through the corresponding interface (as indicated by an arrow 1111). The optical transmission unit 1102 may be composed of a laser, a modulator, a VOA, a drive circuit and the like, in order to implement the electro-optic conversion of the data and device management feedback signal and the module management feedback signal (as indicated by an arrow 1120).

The management signal extracting module 112 and the management signal loading module 113 are connected to the multi-wavelength passive optical network device through the data and device management signal interface.

The management signal extracting module 112 may separate the module management signal and the data and device management signal from each other by way of amplitude detection, filtering and the like, send the module management signal to a management signal processing module 115 inside the module control and storage center 114 (as indicated by an arrow 1115), and send the data and device management signal to the data and device management signal interface (as indicated by an arrow 1113). In an implementation, the management signal extracting module 112 receives the data and device management signal and the module management signal inputted through different interfaces, sends the module management signal to the management signal processing module 115 inside the module control and storage center 114 (as indicated by the arrow 1115), and sends the data and device management signal to the data and device management signal interface (as indicated by the arrow 1113).

The management signal loading module 113 receives the data and device management feedback signal inputted through the data and device management signal interface (as indicated by an arrow 1123) and the module management feedback signal inputted by the management signal processing module 115 inside the module control and storage center 114 (as indicated by an arrow 1125). The management signal loading module 113 combines the data and device management feedback signal and the module management feedback signal together by way of mixing and the like, and transmits the combined signal to the optical transmission unit 1102 in the receiving and transmitting optical component 111 (as indicated by an arrow 1121). In an implementation, the management signal loading module 113 transmits the data and device management feedback signal and the module management feedback signal to the optical transmission unit 1102 through different interfaces (as indicated by the arrow 1121).

The module control and storage center 114 includes the management signal processing module 115, an optical component control module 116 and other control and storage modules. The module control and storage center 114 may have control functions on management signal processing, optical component control, and data buffering as well as initialization, alarm detection, performance statistics and management message feedback statistics, etc. of various function units in the entire module. Within the module control and storage center 114, the management signal processing module 115 parses the inputted module management signal and transmits the parsed signal, for example, to the optical component control module 116 to control the receiving and transmitting optical component 111 (as indicated by arrows 1116 and 1117). The optical component control module 116 sends a feedback message to the management signal processing module 115 (as indicated by an arrow 1126) after responding to the module management signal. Also, the management signal processing module 115 sends a management feedback message inside the module to the management signal loading module 113 (as indicated by the arrow 1125).

Fifth Embodiment

Figure 12:
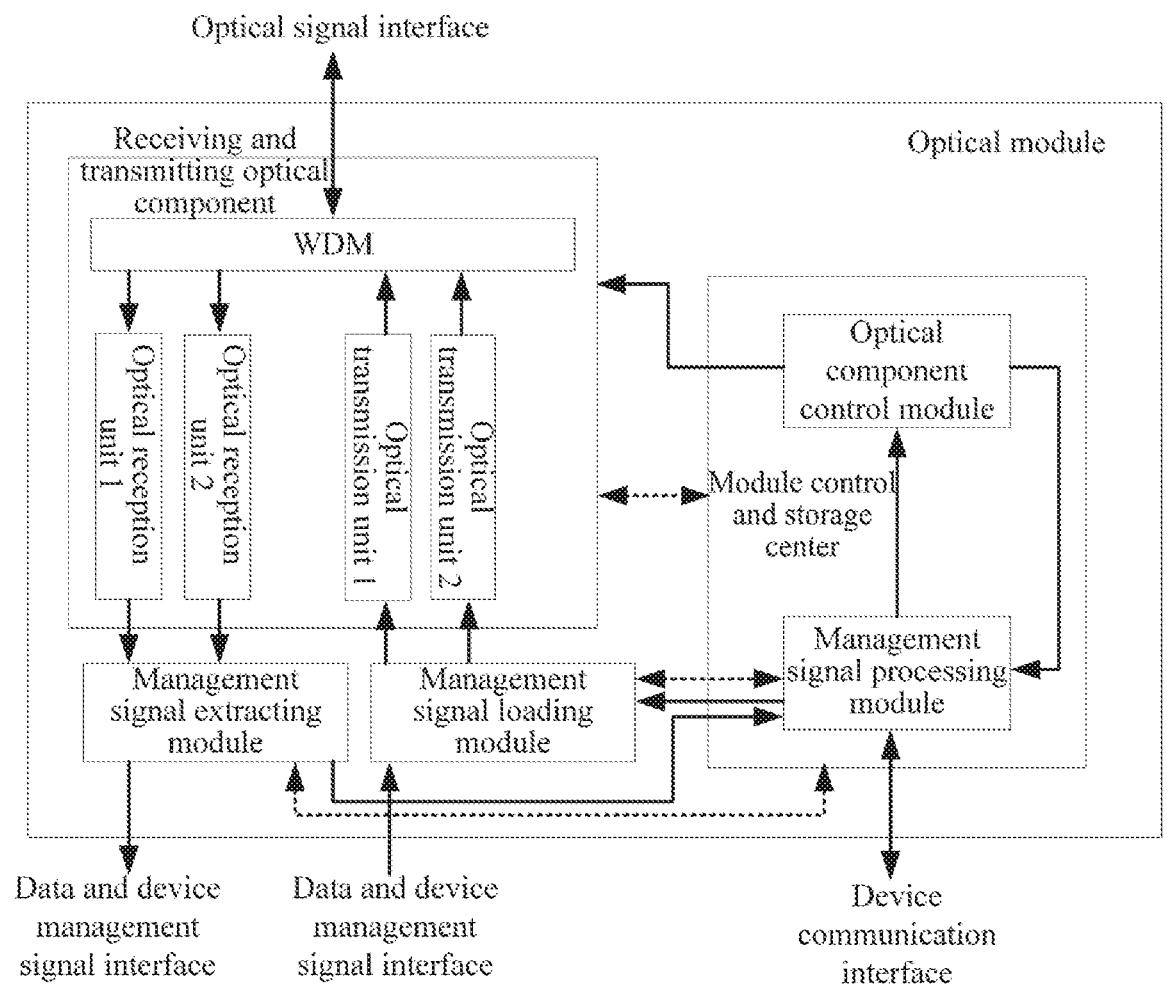
FIG. 12 is a structural view of an optical module for a multi-wavelength passive optical network according to a fifth embodiment of the present disclosure.

FIG. 12 is a structural view of an optical module for a multi-wavelength passive optical network according to a fifth embodiment of the present disclosure. As shown in FIG. 12, the optical module for the multi-wavelength passive optical network according to this embodiment includes a receiving and transmitting optical component, a management signal extracting module, a management signal loading module and a module control and storage center.

Here, the function of a signal processing unit is implemented by the management signal extracting module and the management signal loading module. The function of a module control unit is implemented by the module control and storage center.

The receiving and transmitting optical component is connected to an ODN through an optical signal interface. The receiving and transmitting optical component includes, for example, two optical reception units, two optical transmission units and a WDM unit. The WDM unit may conduct multiplex or demultiplex on optical signals with different wavelengths to the corresponding optical reception units and optical transmission units, respectively. The optical signals with different wavelengths are used to carry a data and device management signal and a module management signal, respectively. The optical reception unit may be composed of a photodetector, a transimpedance amplifier, a limiting amplifier and the like, in order to implement functions such as photoelectric conversion, electric signal amplification and limiting and shaping of the optical reception signal. Moreover, the optical reception unit transmits the data and device management signal and the module management signal to the management signal extracting module through the corresponding interface. The optical transmission unit may be composed of a laser, a modulator, a VOA, a drive circuit and the like, in order to implement the electro-optic conversion of the data and device management feedback signal and the module management feedback signal.

The management signal extracting module transfers the data and device management signal and the module management signal inputted through different interfaces to the data and device management signal interface and a management signal processing module inside the module control and storage center, respectively.

The management signal loading module transfers, the data and device management feedback signal inputted through the data and device management signal interface and the module management feedback signal inputted by the management signal processing module inside the module control and storage center, to the optical transmission unit through different interfaces.

The module control and storage center includes the management signal processing module, an optical component control module and other control and storage modules. The module control and storage center may have control functions on management signal processing, optical component control, and data buffering, as well as initialization, alarm detection, performance statistics and management message feedback statistics, etc. of various function units in the entire module. Within the module control and storage center, the management signal processing module parses the inputted module management signal and then transmits the parsed signal to the optical component control module to control the receiving and transmitting optical component. The optical component control module sends a feedback message to the management signal processing module after responding to a management and control message. Further, the management signal processing module sends a management feedback message inside the module to the management signal loading module.

In summary, in the embodiments of the present disclosure, the optical module does not need to control and adjust the physical layer parameter with the assistance of a device, but may manage and control the physical layer parameter by the optical module itself to satisfy applications of existing network devices such as mobile bearers and switches, thereby achieving the smooth evolution of the network. Moreover, the embodiments of the present disclosure further provides a management interface between the optical module and the device, and is applicable to an application scenario in which the device needs to be managed.

It is understandable by those skilled in the art that all or some steps in the above-mentioned method may be completed by relevant hardware (such as a processor) as instructed by programs, and the programs may be stored in a computer-readable storage medium, such as a read-only memory, a magnetic disk and an optical disk. In an implementation, all or some steps in the above-mentioned embodiments may be implemented by one or more integrated circuits. Accordingly, various modules/units in the above-mentioned embodiments may be implemented in the form of hardware. For example, the functions of these modules/units may be implemented by one or more integrated circuits. In an implementation, these modules/units may be implemented by software function modules. For example, the functions of these modules/units may be implemented by using a processor to execute program instructions stored in a storage medium. The present application is not limited to any specific combination of hardware and software.

The above illustrate and describe the basic principles, main features and advantages of the present application. The present application is not limited to the above embodiments. The above embodiments and specification describe only the principles of the present application. Various modifications and improvements may be made in the present application without departing from the spirit and scope of the present application. These modifications and improvements are within the scope of the present application.

INDUSTRIAL APPLICABILITY

The embodiments of the present disclosure provided a method for managing a multi-wavelength passive optical network and an optical module. The optical module does not need to control and adjust a physical layer parameter with the assistance of a device, and may manage and control the physical layer parameter by the optical module itself to satisfy applications of existing network devices such as mobile bearers and switches. Moreover, the method and the optical module are widely applicable to the existing network devices and new devices, thereby achieving the smooth evolution of the multi-wavelength passive optical network.

What is claimed is:

1. A method for managing a multi-wavelength passive optical network, which is applicable to an optical module for the multi-wavelength passive optical network, comprising:
    operating the optical module to extract a module management signal from a received signal inputted through an optical signal interface, wherein the module management signal carries a management message related to the optical module,
    wherein the optical module extracts the module management signal and a device management signal from the received signal inputted through the optical signal interface, wherein the module management signal carries the management message related to the optical module, and the device management signal carries a management message related to a multi-wavelength passive optical network device,
    wherein operating the optical module to the module management signal and the device management signal from the received signal inputted through the optical signal interface comprises:

operating the optical module to distinguish between the module management signal and the device management signal,
wherein the operating the optical module to distinguish between the module management signal and the device management signal comprises:
operating the optical module to distinguish between the module management signal and the device management signal according to frequencies of the signals, wherein the frequency of the module management signal is different from the frequency of the device management signal; or
operating the optical module to distinguish between the module management signal and the device management signal according to wavelengths of the signals, wherein the wavelength of the module management signal is different from the wavelength of the device management signal.

2. The method according to claim 1, further comprising:
operating the optical module to load, a device management feedback signal transmitted by the multi-wavelength passive optical network device, a data signal transmitted by the multi-wavelength passive optical network device and a module management feedback signal sent from the optical module, into a transmission signal, and send the transmission signal.

3. The method according to claim 1, wherein the operating the optical module to distinguish between the module management signal and the device management signal comprises:
operating the optical module to distinguish between the module management signal and the device management signal according to a management message frame, wherein the management message frame comprises at least one of: a management message-type check byte, a destination address or a device identifier (ID).

4. An optical module for a multi-wavelength passive optical network, comprising: a receiving and transmitting optical component, a signal processing unit and a module control unit, wherein
the signal processing unit is configured to extract a module management signal from a received signal received by the receiving and transmitting optical component through an optical signal interface, and transmit the module management signal to the module control unit, wherein the module management signal carries a management message related to the optical module; and
the module control unit is configured to manage the optical module according to the module management signal, wherein
the optical module is connected to a multi-wavelength passive optical network device through a device management signal interface; and
the signal processing unit is configured to extract the module management signal and a device management signal from the received signal received by the receiving and transmitting optical component through the optical signal interface, transmit the module management signal to the module control unit, and transmit the device management signal to the multi-wavelength passive optical network device through the device management signal interface, wherein the module management signal carries the management message related to the optical module and the device management signal carries a management message related to the multi-wavelength passive optical network device; and
the module control unit is configured to manage the optical module according to the module management signal.

5. The optical module according to claim 4, wherein
the received signal comprises one signal or a plurality of signals;
when the received signal comprises the one signal, the one signal comprises a combination of a data signal, the module management signal and the device management signal; and
when the received signal comprises the plurality of signals, the plurality of signals comprise the data signal, the module management signal and the device management signal, or the plurality of signals comprise the data signal and a management signal.

6. The optical module according to claim 4, wherein
the signal processing unit comprises: a first processing unit and a second processing unit, wherein
the first processing unit is configured to extract a management signal from the received signal and transmit the extracted management signal to the second processing unit; and
the second processing unit is configured to extract the module management signal and the device management signal from the management signal, transmit the module management signal to the module control unit, and transmit the device management signal to the multi-wavelength passive optical network device through the device management signal interface.

7. The optical module according to claim 6, wherein
the second processing unit is further configured to, combine a device management feedback signal inputted through the device management signal interface with a module management feedback signal inputted by the module control unit and send the combined management feedback signal to the first processing unit; or send the device management feedback signal inputted through the device management signal interface and the module management feedback signal inputted by the module control unit to the first processing unit.

8. The optical module according to claim 6, wherein
the optical module is connected to the multi-wavelength passive optical network device through a data signal interface; and
the first processing unit is further configured to, send a data signal inputted through the data signal interface and a management feedback signal inputted by the second processing unit to the receiving and transmitting optical component through the respective interfaces; or combine the data signal inputted through the data signal interface with the management feedback signal inputted by the second processing unit and send the combined signal to the receiving and transmitting optical component.

9. The optical module according to claim 4, wherein
the optical module is connected to the multi-wavelength passive optical network device through a data signal interface; and
the signal processing unit is further configured to, send a module management feedback signal inputted by the module control unit, a device management feedback signal inputted through the device management signal interface and a data signal inputted through the data signal interface to the receiving and transmitting optical component through the respective interfaces.

10. The optical module according to claim 4, wherein
the module control unit is configured to obtain a management instruction according to the module management signal, send the management instruction to the receiving and transmitting optical component, and send feedback information from the receiving and transmitting optical component to the signal processing unit.

11. The optical module according to claim 4, wherein
the signal processing unit is configured to distinguish between the module management signal and the device management signal according to a management message frame, wherein the management message frame comprises at least one of: a management message-type check byte, a destination address or a device identifier (ID).

12. The optical module according to claim 4, wherein,
the signal processing unit is configured to distinguish between the module management signal and the device management signal according to frequencies of the signals, wherein the frequency of the module management signal is different from the frequency of the device management signal; or
the receiving and transmitting optical component is configured to distinguish between the module management signal and the device management signal according to wavelengths of the signals, wherein the wavelength of the module management signal is different from the wavelength of the device management signal.

* * * * *